United States Patent

[11] 3,598,396

[72] Inventors Donald R. Andrews
Lexington, Ky.;
Larry H. Robbins, Austin, Tex.

[21] Appl. No. 831,948
[22] Filed June 10, 1969
[45] Patented Aug. 10, 1971
[73] Assignee International Business Machines Corporation
Armonk, N.Y.

[54] RECORD CARD HANDLING DEVICE WITH MULTIPLE FEED PATHS

5 Claims, 5 Drawing Figs.

[52] U.S. Cl. .......... 271/9, 271/41
[51] Int. Cl. .......... B65h 1/06
[50] Field of Search .......... 271/9, 3, 4, 10, 64, 41

[56] References Cited
UNITED STATES PATENTS
3,304,080 2/1967 Greenblott et al. .......... 271/9

*Primary Examiner*—Joseph Wegbreit
*Attorneys*—Hanifin and Jancin and John W. Girvin, Jr.

ABSTRACT: A record card handling device incorporating multiple feed paths for automatic and manual card feeding operations and multiple feed paths for automatic and manual card ejection operations. Cards are automatically fed from a card hopper over a first feed path or from a manual entry station over a second feed path to a card transport for data processing operations. Cards are ejected from the card transport to a card stacker over a third feed path or to the manual entry station over the second feed path in accordance with the operation specified. Each of the feed paths are vertically oriented with respect to one another. A card-sensing device coacts with the card-feeding means to insure cards cannot be entered onto the transport through the manual entry station when a card is present on the card transport and is further utilized to control card motion on the card transport.

INVENTORS.
DONALD R. ANDREWS
LARRY H. ROBBINS
BY John W Girvin, Jr
ATTORNEY.

RECORD CARD HANDLING DEVICE WITH MULTIPLE FEED PATHS

CROSS-REFERENCES TO RELATED APPLICATIONS

The following applications are all assigned to the same assignee as the present invention.

U.S. Pat. No. 3,523,287 entitled "Recording and Playback System Incorporating a First Character Positioning System," D. J. Morrison, et al., as inventors, issued Aug. 4, 1970.

U.S. Pat. No. 3,530,448 entitled "Data Reading, Recording and Positioning System," D. E. Clancy, et al., inventors, issued Sept. 22, 1970.

U.S. Pat. No. 3,524,164 entitled "Detection and Error Checking System for Binary Data," C. W. Cox, et al., inventors, issued Sept. 11, 1970.

U.S. Pat. application Ser. No. 623,053 entitled "Data System with Printing, Composing, Communications and Magnetic Card Processing Facilities," Robert A. Kolpek, inventor, filed Mar. 14, 1967.

BRIEF BACKGROUND OF INVENTION

1. Field

The present invention relates to a record card-handling device, and more particularly, to a record card-handling device having a plurality of feed paths for effecting manual and automatic card-feeding and card ejection operations.

2. Description of the Prior Art

Prior art card transports and card-handling devices generally include card hoppers and card stackers for the automatic feeding and stacking of cards. Cards are typically automatically introduced to a card transport from a card hopper for the transducement of information from or to the card and thereafter, the card is ejected to a card stacker. Most such systems provide no means for manually inserting a card onto the card transport and, where such means are provided, the card is generally fed over the same path as those cards which are fed from the card hopper. An additional form of prior art system is one wherein cards are manually inserted into the card transport for the transducement of information and thereafter partially ejected from the card transport for operator removal. Such a system is described in the aforereferenced copending application of Robert A. Kolpek. None of the aforedescribed prior art devices provide a separate automatic card entry feed path, a separate manual card entry and ejection feed path and a separate automatic card ejection feed path to and from a card transport device. Additionally, those prior art devices which include both automatic an manual card insertion are generally bulky inasmuch as it is necessary to serially arrange the card hopper and the manual insertion stations along a single common feed path.

A further feature of many prior art devices is the utilization of sensing means on the card transport to detect the presence or absence of a card at a specific position. Such devices are often utilized to inhibit the further automatic feeding of cards and/or to detect the presence of more than one card on the card transport. However, such devices do not coact with the card-feeding means to prevent the manual insertion of a card onto the card transport when a card is already present.

SUMMARY

In order to overcome the above problems of the prior art and to provide a compact and efficient record card-handling device adapted to receive both automatically and manually fed record cards, the record card-handling device of the present invention is provided with a card feed path and drive means for manual card entry and card ejection over the feed path and a card detection device for detecting the presence of a card on a card transport for providing a signal to the drive means to prevent further manual card insertion. The detection device also controls card ejection over a separate card-stacking feed path which is provided for the automatic removal of cards from the card transport and further control automatic card-feeding from a card hopper over a third card feed path. Each of the card feed paths are vertically aligned with respect to one another and are coupled to a common card transport. The detection device controls a card gate which is actuable to alternatively eject cards over the stacking feed path or the manual feed path.

The vertical arrangement of the card-feeding paths effects a compact system while the utilization of single detection and card ejection devices for a plurality of functions minimizes costs.

The foregoing and other features and advantages of the invention will be apparent from the following more particular description of the preferred embodiment of the invention as illustrated in the accompanying drawings.

FIGS. **4*a* and 4*b*** are timing diagrams of card-feeding and card ejection operations.

Figure 1:
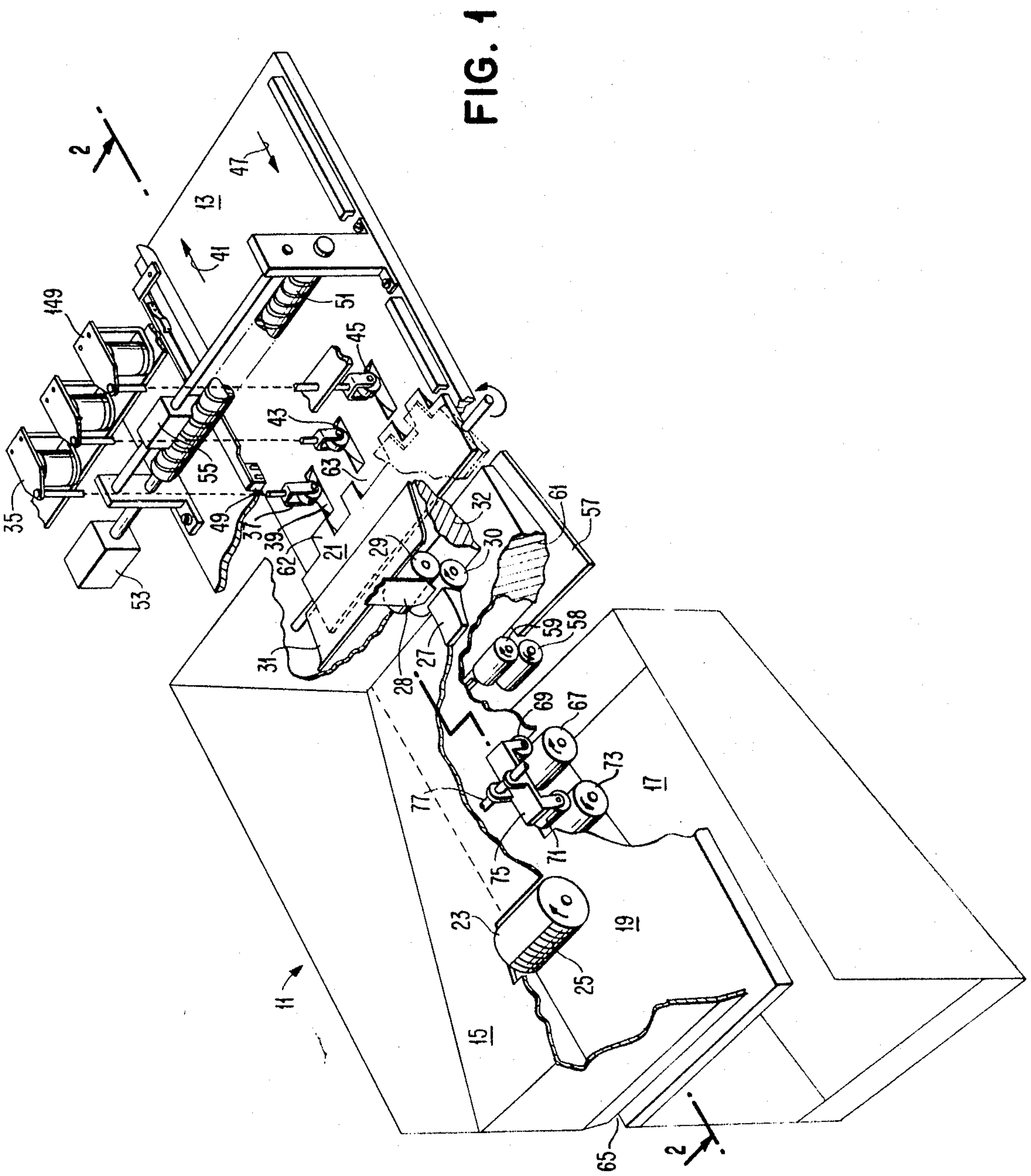
FIG. 1 is a schematic perspective diagram of the record card-handling device of the present invention.

Referring now to FIG. 1, a perspective schematic diagram of the record card-handling device 11 comprises a flat bed card transport 13, an input card hopper 15, an output card stacker 17, and a card entry/exit transport 19. The card transport 13 and the card entry/exit transport 19 are coplanar and are coupled to one another when the card gate 21 is in its closed position as shown. Cards, (not shown) are stacked in the card hopper 15 and the bottommost card in the stack is fed from the card hopper 15 to the card transport 13 over a first card-feeding path when the card picker roller 23 is rotated in a clockwise direction. The card picker roller 23 has a material of a high coefficient of friction located on a segment 25 thereof which engages the bottommost card and causes it to move through the throat members 27 and 28 to the continuously rotating drive rollers 29 and 30. Thereafter, the card is fed by the continuously rotating drive rollers under the card guide 31 and over the member 32 to the card gate 21 which which is maintained in its closed position during a card-feeding operation.

As a card continues its motion to the right, it covers a photosensing device, (not shown), embedded in the card transport 13 thereby providing an electrical signal which is utilized to actuate the magnet and armature assembly 35. Actuation of the magnet and armature assembly causes the idler roll 37 to engage the continuously rotating drive roll 39 so that when the card engages the drive roll-idler roll combination, it is fed in the direction of arrow 41 over the card transport 13 toward the rear of the machine. When the photosensing device is thereafter uncovered by the card, the magnet and armature assembly 35 is deenergized, and the card is positioned for a data recording or a data playback operation under the control of idler roll-drive roll combinations 43 and 45 which effect card motion in the direction of arrows 41 and 47, respectively. This operation is described in detail in the aforereferenced copending application of D. J. Morrison, et al. It should be noted that each of the drive rolls located on the card transport 13 and card entry/exit transport 19 are slightly recessed below their respective transport and have no effect on card motion until their corresponding idler roll is actuated.

Information is magnetically recorded on the card or read from the card by the transducer 49 as the card moves on the card transport 13 in the direction of arrow 47 thereunder in accordance with the activation of the idler roll-drive roll combinations 43 and 45. A detailed description of a recording operation can be found in the aforereferenced copending application of D. E. Clancy, et al., and a detailed description of a reproducing operation can be found in the aforereferenced application of C. W. Cox, et al. As the card advances in the direction of arrow 47, it passes over the card gate 21 onto the card entry/exit transport 19 and under the member 32. When a complete track of information on the card has been transduced by transducer 49, the card is returned in the direction of arrow 41 under the control of the idler roll 37 and its corresponding drive roll 39. Thereafter, the transducer 49 is moved under the control of the lead screw 51 to an adjacent data track for the subsequent transducement of information on that track. The lead screw is rotated under the control of the clutch 53 thereby effecting motion of the lead screw follower 55 to which the transducer 49 is attached. With the transducer thus positioned, card motion is again effected in the direction of arrow 47. In this manner, a plurality of tracks of information located on the card can be transduced by reciprocating the card back and forth in the directions of arrows 41 and 47 over the card transport 13, the card gate 21, and the card entry/exit transport 19.

When the desired information has been transduced, the card may be stacked in the card stacker 17 to thereby free the card transport 13 for the feeding of an additional card. In order to stack a card in the card stacker 17, the card is first returned in the direction of arrow 41 to the rearmost position which it may occupy on the card transport 13. Thereafter, the card gate 21 is pivoted in a counterclockwise direction to a position shown partially in phantom. Thereafter, the card is moved in the direction of arrow 47 under the card gate 21 onto the card guide 57 until its leading edge is engaged by the continuously rotating drive rolls 58 and 59 which engage the card and effect its deposit in the card stacker 17. As the card passes over the card guide 57, it passes under member 61, the upper surface of which forms a portion of the card entry/exit transport 19. The card gate 21 contains a plurality of finger projections 62 which intermesh with the downward curved finger projections 63 of the card transport 13. Thus, a card moving over the surface of the card gate 21 rests on the finger projections 62 which are coplanar with the card transports and a card moving under the card gate rests on the finger projections 63 and is thus projected along a downwardly curved path.

When it is desirous to manually feed a card to the card transport 13, a card is inserted through the entry throat 65 and thus placed onto the card entry/exit transport 19. The card is manually pushed along the transport 19 in the direction of arrow 41 until it engages the drive roll 67. As will be described hereinafter, during a manual entry operation, the idler roll 69 is biased so as to engage the drive roll 67 while the idler roll 71 does not engage its corresponding drive roll 73. The card is gripped by the drive roll 67—idler roll 69 combination and driven in the direction of arrow 41 over the card entry/exit transport 19 and the closed card gate 21 until it covers the aforedescribed forward photosensing device (not shown). Thereafter, the magnet-armature assembly 35 is actuated in a manner similar to that when a card is fed from the card hopper 15 and the card is moved to the rearmost position of the card transport 13 in the direction of arrow 41. Once the presence of the card is detected by the photosensing device, the idler roll support 75 is pivoted about the pivot rod 77 so that the idler roll 71 engages its corresponding drive roll 73 and the idler roll 69 is disengaged from its corresponding drive roll 67. Thereafter, any card which is attempted to be inserted into the machine through the throat 65 is ejected by the drive roll 73. Additionally, movement of the card over the drive roll 67 which is located below the surface of the card transport 19 has no effect on the card motion.

Often it is desirous to eject cards located on the card transport 13 through the entry throat 65 so that the operator may remove the card therefrom. This action may be initiated by the operator in response to certain error conditions which are detected by the machine wherein it is desirous to have the operator determine if the card medium is defective, or the action can be initiated whenever the operator desires to receive a particular card. When the card eject operation is initiated, the card is moved in the direction of arrow 47 under the control of the idler roll drive wheel combination 45 over the card transport 13, the card gate 21 and the card entry/exit transport 19. Card motion thus continues until the leading edge of the card engages the drive roll 73 whereupon the card continues to be fed until a portion of it protrudes through the entry throat 65. Card motion is halted when the card passes over a photosensing device (not shown) located in the card transport 19 between the drive rolls 73 and 67. Absence of the card over this device causes the idler roll support 75 to pivot about the pivot rod 77 so that the idler roll 69 engages the drive roll 67 and the idler roll 71 does not engage the drive roll 73. Thereafter, the card may be removed by the operator or inserted into the machine in a manner heretofore described. If a machine error condition precedes the ejection operation, the transducer 49 keeps its position. If no error precedes the ejection operation, the transducer 49 returns to an initial position upon the insertion of a card onto the card transport 13.

Figure 2:
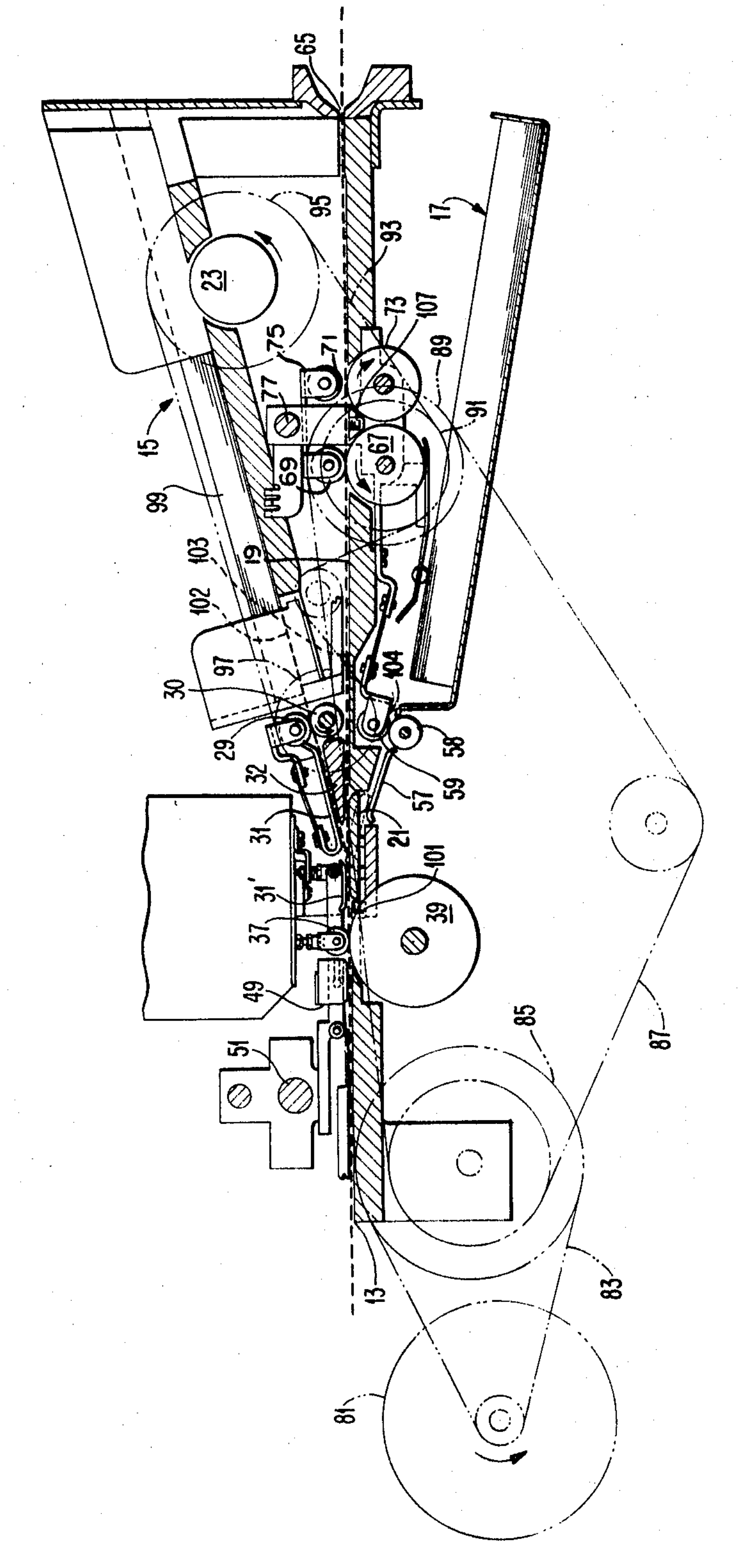
FIG. 2 is a side elevation view partly in section of the record card-handling device of the present invention.

Referring now to FIG. 2 of the drawings, a side elevation view partly in section along the line 2–2 of FIG. 1 of the record card-handling device is depicted. As has been described, card motion is effected by various sets of drive roll and idler roll combinations. The various drive rolls are powered from a single motor source 81 which is coupled by the drive belt 83 to an inertia wheel 85. The inertia wheel 85 is coupled by the drivebelt 87 to the drive pulley 89. The drive pulley 89 is coaxially mounted on the same shaft with the drive roller 67 effecting its rotation in a counterclockwise direction. The drive roll 67 is directly coupled by gearing (not shown) to the drive roll 73 thereby effecting its rotation in a clockwise direction. A second pulley 91 is mounted coaxially with the drive pulley 89 and rotated thereby to effect motion of the drivebelt 93 which in turn drives the drive pulleys 95 and 97. The drive pulley 95 is connected to the card picker roller 23 by a clutch (not shown) which effects a selective coupling from the drive pulley 95 to the card picker roller 23. The drive pulley 97 is coaxially mounted with respect to the drive roller 30 thereby effecting its motion in a counterclockwise direction.

The motor source 81 is also connected (not shown) to the drive roll 39 and to the other drive rolls (not shown) mounted coaxially with the drive roll 39, and to roller 58.

As has been described, cards 99 are stacked in the card hopper 15 and the bottommost card is fed to the continuously rotating drive rollers 29 and 30 upon the rotation of the card picker roller 23. The card picker roller 23 is rotated when the clutch (not shown) connecting the card picker roller to drive pulley 95 is engaged. The card is thereafter fed over the member 32 to the card gate 21 and thence to the drive roll 39. Card motion thereafter continues to the left under the control of drive roll 39 and its corresponding actuated idler roll 37 until the card is no longer adjacent to the forward photosensing station 101 at which time card motion ceases. The card path from the card hopper 15 to the card transport 13 is shown by the broken line 102.

Thereafter, information is transduced from or to the card by the transducer 49 as the card moves to the right under the card guide 31′, over the card gate 21 and over the card entry/exit transport 19. As has been described, as each track of information is thusly transduced, the card is returned to its leftmost position and the transducer 49 is moved to transduce a further track of information. This card path is shown by the broken line 103.

When it is desirous to eject a card into the card stacker 17, the card is moved to its leftmost position and the card gate 21 is pivoted to the position shown in phantom. Thereafter, the card moves to the right under the card gate 21 over the card guide 57 to the continuously rotating drive rolls 58—59 which thereafter control stacking the cards in the card stacker 17. A lower drive roll feedback contact switch 104 senses card presence at the drive rolls 58—59 and provides a signal indicating that the card is not yet stacked.

As has also been previously described, a card may be manually inserted through the entry throat 65 until it engages the drive roll 67 which thereafter drives the card to the left over the card entry/exit transport 19 and the card gate 21.

Thereafter, the card covers the forward photosensing device 101 and card motion to the left continues under the control of drive roll 39 in a manner similar to that described above with respect to hopper fed cards. After the card covers the forward photosensing device 101, the idler roll support member 75 pivots about the pivot rod 77 so that the idler roll 71 engages the drive roll 73 thereby precluding the manual entry of additional cards. As will be hereinafter described, the idler roll 71 also engages the drive roll 73 when cards fed from the card hopper 15 are located on the card transport 13.

When it is desirous to eject a card through the entry throat 65, the card is moved under the control of the drive roll (not shown) mounted coaxially with respect to the drive roll 39 until the card engages the drive roll 73 and idler roll 71. The card thereafter continues to be driven to the right by the drive roll 73 until the entry photosensing device 107 is no longer covered by the card. At this time, the idler roll support 75 pivots about pivot rod 77 so that the idler roll 69 engages the drive roll 67 and the idler roll 71 disengages the drive roll 73. Thereafter, the card which partially protrudes from the throat 65 may be manually removed or reinserted into the machine.

Figure 3:
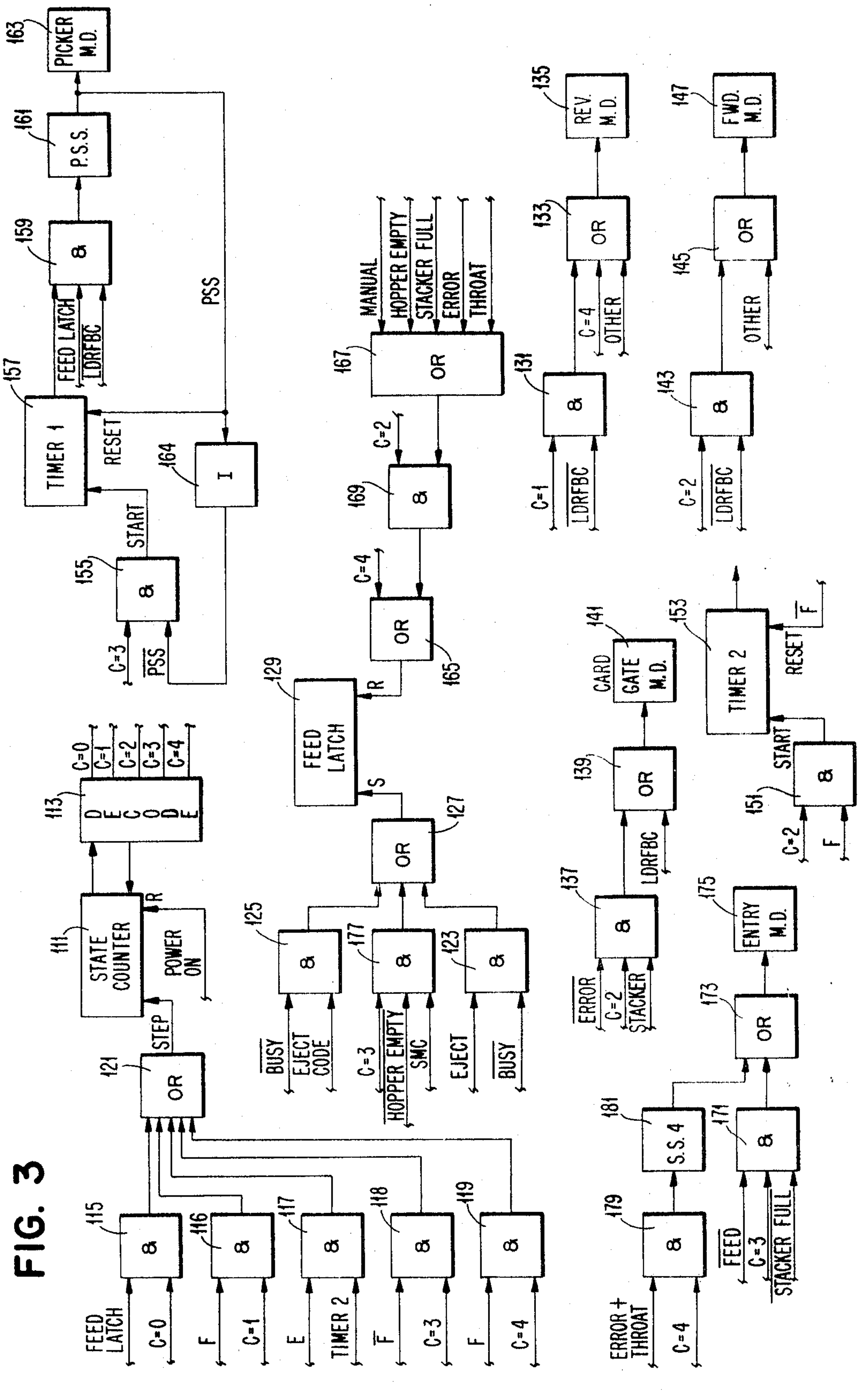
FIG. 3 is a schematic diagram of the electronic circuits which control card-feeding and card ejection operations.

The foregoing description has related to the mechanical card driving system in the card-handling device of the present invention. Referring now to FIG. 3 of the drawings, a schematic diagram of the electronic circuits which control the card-feeding and card ejection operations are depicted. The basic system control is provided by the state counter 111, the output of which is decoded by a decode circuit 113 which in turn provides a plurality of discrete outputs indicative of the current status of the state counter 111. The state counter is reset initially when power is turned onto the machine to a "0" state if a card is present on the card transport 13 of FIG. 2 as sensed by the photosensing device 101 and the counter is reset to a "3" state if a card is not so present. Thereafter, the state counter advances from its initial count to a count of "4" then recycles to "0" in accordance with various machine conditions which are detected. AND gates 115—119 provide a counter advance signal to the OR gate 121 which in turn provides a stepping pulse to the state counter 111 to cause it to advance. Each of the AND gates 115—119 provides a counter advance output only when the counter is in a particular unique state. Thus, the AND gate 115 provides an output to advance the counter from a "0" state to a "1" state, the AND gate 116 provides an output to advance the counter from a "1" state to a "2" state and so on, the AND gate 119 providing an output to advance the counter from a "4" state to a "0" state.

Each of the states of the state counter 111 corresponds to a specific operation: the "0" state corresponding to the state that the counter assumes during a data transducement operation; the "1" state corresponding to the initiation of a card eject cycle when a card is driven to the rearmost position of the machine; the "2" state corresponding to the time interval during which a card is ejected by being driven in the forward direction to either the card stacker or to the manual entry throat; the "3" state corresponding to the time interval during which a new card can be fed into the machine from either the card hopper or the manual entry throat; and the "4" state corresponding to the time interval during which the newly inserted card is initially positioned on the card transport for subsequent transducing operations.

In the discussion which follows, the operation of the electronic circuits of FIG. 3 during a card stacking and subsequent automatic card-feeding operation will be described. Thereafter, a description of the operation of these circuits during an entry throat card ejection and card insertion operation will be described. For the purposes of illustration, it will be assumed that a card is located on the card transport 13 of FIG. 2 and that data is being transduced therefrom by the transducer 49. Automatic card stacking and subsequent card feeding is effected whenever the manual automatic mode switch (not shown) is in its automatic position and whenever the stacker/throat mode switch (not shown) is in its stacker position. Automatic card stacking and subsequent card feeding is initiated upon operator depression of an eject button (not shown) thereby providing an input signal to the AND gate 123 or upon the transducement of an eject code from the card medium thereby providing an input signal to the AND gate 125. Each of the AND gates 123 and 125 are further gated with a "not busy" signal indicating that the device is not in a transducing operation. The output signals of the AND gates 123 and 125 are provided to the OR gate 127 which in turn provides a set signal to the feed latch 129. When the feed latch 129 is set, the AND gate 115 provides an output signal which causes the state counter 111 to advance to its "1" state.

When the counter advances to its "1" state, it controls the record card-handling device and causes the card located thereon to be driven to the rearmost position of the machine to insure that it is clear of the card gate 21 of FIG. 2. Thus, at this time, the AND gate 131 which is gated with the $C=1$ state and the absence of a signal from the lower drive roll feedback contact switch, provides an output signal to the OR gate 133 which in turn causes the reverse magnet driver 135 to provide an output signal. This output signal is utilized to energize the magnet and armature assembly 35 of FIG. 1 to thereby effect card motion toward the rear of the machine. As the card moves to the rear of the machine, it uncovers the forward photosensing device 101 of FIG. 2 which provides a gating signal to the AND gate 116. The output signal of the AND gate 116 causes the state counter 111 to advance to its $C=2$ state, thereby removing the $C=1$ input to the AND gate 131 thus effecting the cessation of card movement in the reverse direction.

When the state counter advances to its "2" state, the card is driven in the forward direction under card gate 21 of FIG. 2 toward the card stacker 17. The card gate is opened when the state counter 111 advances to its "2" state in accordance with the gating signal provided to the AND gate 137 which is also gated by a "not error" signal and a stacker mode switch signal. The output signal of the AND gate 137 gates the OR gate 139 which in turn drives the card gate magnet driver 141. The card gate magnet driver energizes a solenoid (not shown) which causes the card gate to open. Simultaneously, the AND gate 143 which is also gated by the $C=2$ output of the state counter 111 and with a not lower drive roll feedback contact signal provides an output signal to the OR gate 145 which in turn gates the forward magnet driver 147. The forward magnet driver provides an output signal to the magnet and armature assembly 149 of FIG. 1 which causes the idler roll-drive roll combination 45 to become effective to drive the card in the direction of arrow 47 of FIG. 1. When the state counter advances to its "2" state, the AND gate 151 provides an output signal to the timer 2 circuit 153 since the forward photosensing device 101 of FIG. 2 is uncovered at this time. As the card thereafter moves in the forward direction under the control of the forward magnet driver 147, the forward photosensing device is again covered thereby providing a reset signal to the timer 2 circuit 153 prior to the time that the timer would provide an output signal. Thus, the timer provides no signal to the control logic. Referring briefly to FIG. 2, as card motion in the forward direction continues, the card passes under the gate 21 over the card guide 57 to the continuously rotating drive rolls 58 and 59. Thereafter, the card closes the lower drive roll feedback contact switch 104 and continued motion of the card causes its trailing edge to clear the forward photosensing device 101.

Referring again to FIG. 3 of the drawings, when the lower drive roll feedback contact switch is closed, the gating signal to the AND gate 143 is removed thereby removing the signal from the forward magnet driver 147. When the forward photosensing device is uncovered, the AND gate 151 is again gated thereby providing a start signal to the timer 2 circuit 153. When the timer 2 circuit 153 times out, it provides an output signal to the AND gate 117 which is also gated with the output signal of the entry photosensing device. This causes the state counter 111 to advance to its "3" st ate. The card gate magnet driver 141 remains energized as long as the lower drive roll feedback contact switch remains closed due to a gating signal supplied to the OR gate 139. This insures that the card is properly stacked and not "caught" in the card feed prior to closing the card gate. When the state counter advances to its "3" state, the ANd gate 155 provides output signal which initiates the timer 1 circuit 157. When the timer 1 circuit 157 times out, a signal is provided to the AND gate 159 which provides a signal to the picker single shot 161 provided that the lower drive roll feedback contact switch is no longer closed. (The feed latch 129 remains set during the aforedescribed operations.) The picker single shot provides an output signal of fixed duration to the picker magnet driver 163 which in turn picks a clutch (not shown) coupling the drive pulley 95 to the card picker roller 23 of FIG. 2.

The picker single shot 161 is timed to correspond to time needed to drive the card picker roller 23 through a complete revolution. The output signal of the picker single shot 161 resets the timer 1 circuit 157. Additionally, the output signal is logically inverted by the inverter 164 to insure that the timer 1 circuit is not again gated with the input signal of the AND gate 155. Once the card has thus been picked, it moves through the automatic card feed path heretofore described and covers the forward photosensing device 101 of FIG. 2. When the forward photosensing device is thus covered, the AND gate 118 provides an output signal to cause the state counter 111 to advance to its "4" state. If the card does not reach the forward photosensing station in the time interval between the time that the picker single shot 161 goes down and the end of the time interval of the timer 1 circuit 157, it is assumed that a card has not been fed and therefore, the AND gate 159 again provides an output signal to the picker single shot circuit 161. If the card reaches the forward photosensing device prior to the time interval defined by the timer 1 circuit 157, the advance of the state counter 111 to its $C=4$ state removes the input signal from the timer which therefore provides no output signal.

When the state counter advances to its $C=4$ state, it is desirous to cause the newly fed card to advance to the rearmost position of the card transport. Thus, at this time the OR gate 165 provides an output signal which resets the feed latch 129. Additionally, the OR gate 133 is provided with an input signal which causes the energization of the reverse magnet driver 135. The card is thereafter driven to the rear of the machine under the control of the reverse magnet driver 135 until the forward photosensing device is no longer covered by the card. At this time, the AND gate 119 provides an output signal to cause a state counter 111 to advance to its "0" state. Thereafter, the card may be positioned for transducement of information in accordance with the description contained in the aforereferenced copending application of D. J. Morrison, et al.

Figure 4A:
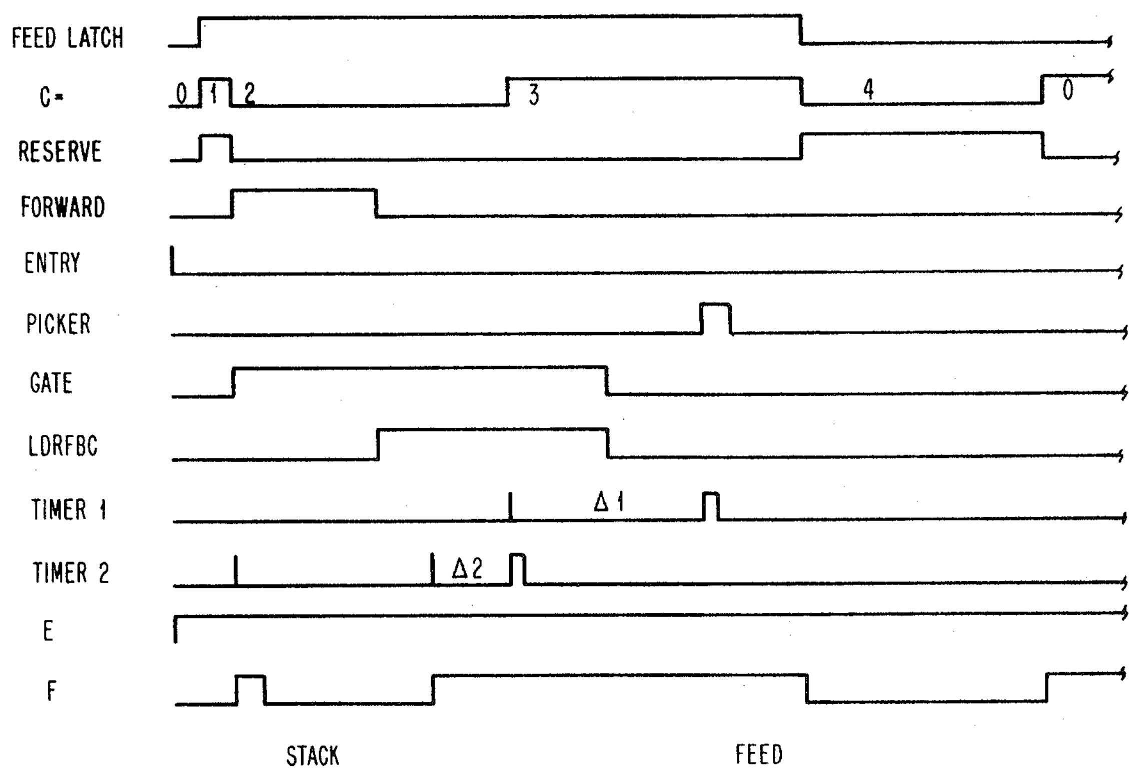
Figure 4B:
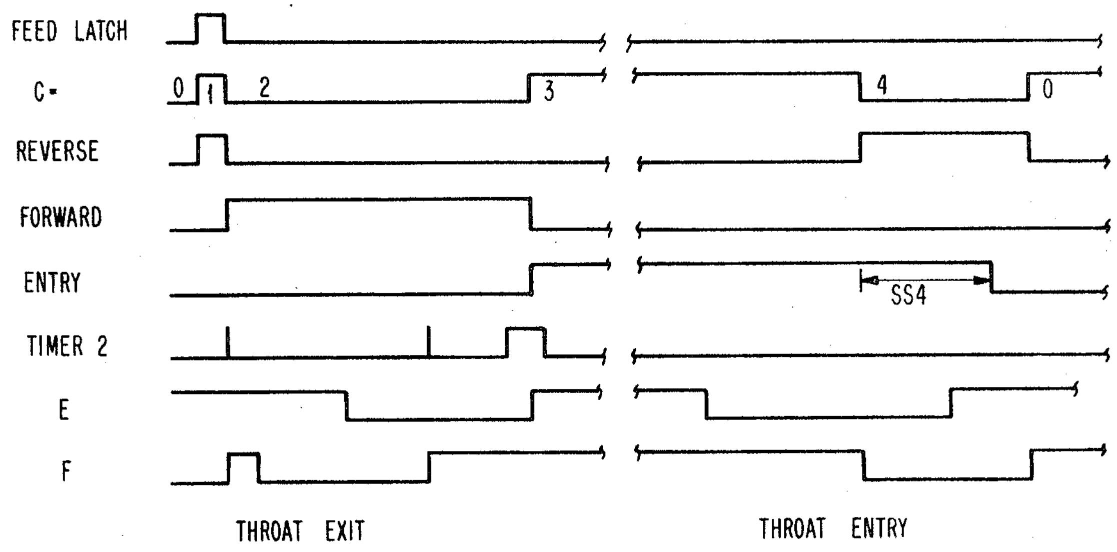

Referring now to FIG. 4*a* of the drawings, a timing diagram of the stacking and feeding operations just described is depicted. As has been described, setting of the feed latch causes the state counter to advance from its "0" to its "1" state and energize the reverse magnet driver. When the card reaches the rearmost position of the machine, the card position is detected by the forward photosensing device and the counter advances to its "2" state causing the forward magnet driver and the gate magnet driver to be energized. Thereafter, the lower drive roll feedback contact switch is energized effecting the removal of the signal from the forward magnet driver, and, at a later time, the forward photosensing device is uncovered by the card providing an output signal which starts the timer 2 circuit running. After a time interval denoted as Δ2, the timer 2 circuit provides an output signal which causes the state counter to advance to its "3" state. The signal from the gate magnet driver is removed when the lower drive roll feedback contact switch opens. Advancement of the counter to its "3" state initiates a card-feeding operation and after a time interval denoted as Δ1, the timer 1 circuit provides an output signal which energizes the picker magnet driver. Thereafter, the newly fed card covers the forward photosensing device thereby causing the state counter to advance to its "4" state and effect the energization of the reverse magnet driver. The card is then driven in the reverse direction until the forward photosensing device is no longer covered at which time the counter advances to its "0" state.

The foregoing description has related to the automatic stack and feed operation of the record card-handling device depicted in FIGS. 1 and 2 of the drawings. The following description will relate to a manual card ejection and card insertion operation. Referring once again to FIG. 3 of the drawings, when an error condition occurs and the operator thereafter depresses the eject button or when the stack/throat mode switch is set to its "throat" position and the operator thereafter depresses the eject button, the card that is present on the card transport is fed out through the entry throat. Depression of the eject button gates the AND gate 123 thereby setting the feed latch 129 which in turn provides an output signal to the AND gate 115 to cause the state counter 111 to advance to its "1" state. The card is then driven to the rearmost position of the machine under the control of the reverse magnet driver 135 until the forward photo detection device is uncovered at which time the AND gate 116 provides a gating signal to advance the state counter to its "2" state. The OR gate 167 provides an output signal to the AND gate 169 indicating that an error has taken place or that an entry throat eject operation is desired. When the state counter advances to its $C=2$ state, the AND gate 169 provides an output signal to the OR gate 165 which in turn provides a reset signal to the feed latch 129 to inhibit any subsequent automatic feeding. Additionally, the AND gate 143 provides a gating signal causing the forward magnet driver 147 to be energized thereby driving the card in the forward direction in order to eject it from the card transport. As the card moves in this direction, it engages the drive roll 73 of FIG. 1 which continues to move the card toward the entry throat 65 of FIG. 1. Thereafter, the forward photosensing station is uncovered and the AND gate 151 provides an output signal to the timer 2 circuit 153. The timer 2 circuit 153 provides an output signal to the AND gate 117 at a fixed time period later. The AND gate 117 is also gated by the output signal from the entry photosensing device which signal does not appear until the card clears the entry photosensing device. At this time, the AND gate 117 causes the state counter 111 to advance to its "3" state.

When the state counter advances to its "3" state, the AND gate 171 provides an output signal to the OR gate 173 which in turn energizes the entry magnet driver 175. Referring briefly to FIG. 2, energization of the entry magnet driver causes the idler roll support 75 to pivot about the pivot rod 77 so that the idler roll 71 disengages the drive roll 73 and the idler roll 69 engages the drive roll 67. The card, which then partially protrudes through the entry throat 65, may be manually removed.

At this time, a card may be inserted through the entry throat 65 or a card may be fed from the card hopper 15 to the card transport 13. Referring once again FIG. 3 of the drawings, if it is desirous to feed a card from the card hopper, a secondary mode contact switch (not shown) is closed thereby gating the AND circuit 177 which in turn sets the feed latch 129. When the feed latch 129 is set, the AND gate 159 is gated effecting a card feed cycle. When the feed latch is set, the signal to the entry magnet driver 175 is removed thus precluding a manual card feed. The operation is thereafter identical to that previously described with respect to automatic card stacking and feeding.

If, instead, it is desirous to feed a card into the entry throat, the card is pushed in until it engages the drive roll 67 of FIG. 2. The card then continues toward the rear of the machine until it covers the forward photosensing device at which time the AND gate 118 provides an output signal to cause the state counter to advance to its "4" state. When the state counter 111 is in its "4" state, the reverse magnet driver 135 is turned on thereby causing the card to continue to move toward the rear of the machine. Additionally, the AND gate 179 provides an output signal turning on the single shot 181. The single shot 181 provides an output signal of fixed duration which keeps the entry magnet driver 175 turned on when the counter advances to the four state. When the single shot times out, the signal is removed from the entry magnet driver 175 thereby causing the idler roll support 75 of FIG. 2 to pivot so that the idler roll 71 engages the drive roll 73 thereby precluding an additional card from being fed into the machine. Thereafter, operation of the device is the same as that heretofore described, the state counter 111 advancing to its zero state when the forward photosensing device is uncovered. One additional operation that may be performed is when the automatic-manual mode switch is in its manual mode, depression of the eject button effects a card stacking operation with no subsequent automatic card-feeding operation. This is because the feed latch 129 is reset with the signal supplied by the OR gate 167 thereby precluding the AND gate 159 from gating the picker single shot 161.

A timing diagram of the throat exit and entry operation is depicted in FIG. **4*b* of the drawings. As described, setting of the feed latch causes the state counter to advance to its $C=1$ state and effect the energization of the reverse magnet driver. When the forward photosensing device is uncovered by the card, the control counter advances to its $C=2$ state, the reverse magnet driver is deenergized, and the forward magnet driver is energized effecting card motion in the forward direction. Thereafter, when the forward photosensing device is again uncovered, the timer 2 circuit is energized and provides an output signal after a time interval Δ2. When the entry photodetection device becomes uncovered, the control counter advances to its $C=3$ state and the entry magnet driver is energized. Thereafter, if a card is inserted in the throat, it is moved along the card transport until the forward photosensing device is covered causing the state counter to advance to its "4" state. The reverse magnet driver is energized and remains so energized until the state counter advances to its "0" state when the forward photosensing device is uncovered. The entry magnet driver remains energized for a period determined by single shot time 554** after the advancement of the state counter to its "4" state.

Referring once again to FIG. 1 of the drawings, it has been described that whenever a new card is inserted onto the card transport 13, the transducer 49 is stepped under the control of the clutch 53 so that it arrives at an initial position. However, when a card is ejected through the entry throat 65 when an error condition exists, the clutch 53 remains unenergized upon the subsequent insertion of a card through the entry throat. This feature enables the operator to take corrective action with respect to the card media as, for example, with magnetic media, the removal of any deposits which may be on the card. Thereafter, when the card is inserted back into the machine, the operator can reproduce the error condition without having to have noted the track on which the error occurred.

With the three card-feeding paths vertically oriented with respect to one another as shown in FIG. 1, supply cards may be dropped into the card hopper 15 by the operator, readily removed or inserted into the entry throat 65 and readily removed from the card stacker 17 by reaching in and gripping the cards. Thus, the vertical alignment is both compact and functional from the operator-card manipulation aspect.

As is understood by those skilled in the art, equivalent forms of card driving arrangements may be utilized without departing from the spirit and scope of the invention. For example, the card picker roller 23 could be replaced with a picker knife and the drive roll-idler roll combinations could be replaced with selectively actuable drive rolls.

Additionally, the transducer 49 of FIG. 1 could be mounted for relative motion with respect to the card medium for transducing operations. A further modification which could be made would be the replacement of the entry photosensing device 107 of FIG. 2 with a fixed time out circuit (e.g., a single shot circuit) to insure that the card was clear of the throat drive roll prior to energizing the entry magnet driver 175 of FIG. 3. Thus, the single shot would determine the point at which the entry magnet driver would be energized.

Additionally, the drive roll 67 of FIG. 1 could be located on the card transport 13 with the result that cards would have to be pushed further into the entry throat 65 before being fed to the card transport 13 under control of the drive roll 67.

While the invention has been particularly shown and described with reference to a preferred embodiment thereof, it should be understood by those skilled in the art, that the foregoing and other changes in form and detail may be made therein without departing from the scope of the invention.

What we claim is:

1. A record card-handling device comprising:
- a record card transport for supporting a record card thereon for data transducing operations;
- a record card entry and exit transport coupled to the record card transport for supporting a record card thereon for relative motion thereover;
- first and second alternatively actuable drive means,
  - said first drive means being located intermediate said second drive means and at least a portion of the record card transport for driving a record card in a first direction toward the record card transport over the entry and exit transport,
  - said second drive means being located adjacent the entry and exit transport for driving a record card in a second direction opposite the first direction over the entry and exit transport;
- means for initiating a card eject operation;
- ejection means responsive to the means for initiating a card eject operation for ejecting record cards from the record card transport to the second drive means;
- detection means for detecting the presence of a record card on the record card transport;
- first means for determining the absence of a record card adjacent to the first drive means;
- second means for determining the absence of a record card adjacent to the second drive means;
- actuating means responsive to the first means, the second means, the detection means and the means for initiating a card eject operation for actuating the second drive means when a record card is present on the record card transport and not adjacent to the second drive means and when a record card is adjacent to the first drive means during a card eject operation.

2. The record card-handling device set forth in claim 1 further comprising:
- a card hopper;
- a card feed transport for coupling the card hopper to the record card transport at a location intermediate the second drive means and at least a portion of the record card transport;
- actuable hopper feeding means for feeding a record card from the card hopper to the record card transport;
- means for initiating an automatic card feed operation;
- second actuating means responsive to the means for initiating an automatic card feed operation and to the detection means for actuating said hopper feeding means when an automatic card feed operation is initiating and when no record card is detected on the record card transport.

3. The record card-handling device set forth in claim 1 further comprising:
- a card stacker;
- a card gate means located intermediate the record card transport and the record card entry and exit transport having a first operative position for coupling said transports and a second operative position for coupling the record card transport to the card stacker and wherein said ejection means is operative to eject record cards from the record card transport to the second drive means when the card gate means is in its first operative position and to eject record cards to the card stacker when the card gate means is in its second operative position;

said actuating means being responsive to the positioning of the card gate means in its second operative position for actuating said second drive means.

4. The record card-handling device set forth in claim 2 further comprising:

a card stacker;

a card gate means located intermediate the record card transport and the record card entry and exit transport having a first operative position for coupling said transports and a second operative position for coupling the record card transport to the card stacker and wherein said ejection means is operative to eject record cards from the record card transport to the second drive means when the card gate means is in its first operative position and to eject record cards to the card stacker when the card gate means is in its second operative position;

said actuating means being responsive to the positioning of the card gate means in its second operative position for actuating said second drive means.

5. The record card-handling device set forth in claim 4 wherein said card hopper, said card stacker, and said record card entry and exit transport are vertically arranged with respect to one another.